US012729561B2

(12) United States Patent
Joaquim et al.

(10) Patent No.: US 12,729,561 B2
(45) Date of Patent: Sep. 8, 2026

(54) ACCESSIBILITY PEDAL FOR A DRAWER OF AN OVEN APPLIANCE

(71) Applicant: Haier US Appliance Solutions, Inc., Wilmington, DE (US)

(72) Inventors: Olurotimi Joaquim, Louisville, KY (US); John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 92 days.

(21) Appl. No.: 18/807,076

(22) Filed: Aug. 16, 2024

(65) Prior Publication Data

US 2026/0049503 A1 Feb. 19, 2026

(51) Int. Cl.
*E05B 1/00* (2006.01)
*F24C 15/18* (2006.01)

(52) U.S. Cl.
CPC .......... *E05B 1/0053* (2013.01); *E05B 1/0015* (2013.01); *F24C 15/18* (2013.01); *E05Y 2900/308* (2013.01)

(58) Field of Classification Search
CPC .... E05B 1/0053; E05B 1/0015; E05B 53/001; F24C 15/18; E05Y 2900/308
USPC ........ 312/348.6, 319.9; 248/304, 306, 345.1, 248/690, 688; 108/47; 292/255, 336.3; 126/41 D; 16/110.1; 220/908
See application file for complete search history.

(56) References Cited

U.S. PATENT DOCUMENTS 2,689,776 A * 9/1954 Cline ...................... F24C 15/18 312/319.9
4,023,875 A 5/1977 Difley et al.
(Continued)

FOREIGN PATENT DOCUMENTS

CH 665538 A5 5/1988
DE 202020001725 U1 5/2020
(Continued)

OTHER PUBLICATIONS

Dallhart, "Door Handles Foot Door Openers, Hands Free Door Opener Sanitary Door Opener Pull Handle for Opening Office Bathroom Outdoor Doors 2Pcs—(Color: Silver)", accessed https://www.amazon.com/Handles-Openers-Sanitary-Opening-Bathroom/dp/B08TRWEB7L?th=1 on Aug. 16, 2024, 4 pages.

*Primary Examiner* — Janet M Wilkens
(74) *Attorney, Agent, or Firm* — Dority & Manning, P.A.

(57) ABSTRACT

An oven appliance may include a cabinet that may define a cooking chamber and a drawer recess positioned below the cooking chamber. The oven appliance may include a drawer assembly slidably mounted to the cabinet within the drawer recess. The drawer assembly may include a drawer and a front panel. The drawer may define a compartment. The front panel may be attached to a front surface of the drawer. The oven appliance may include an accessibility pedal for manipulating a position of the drawer assembly. The accessibility pedal may include a mount body that may be mounted to the front panel. The accessibility pedal may include a catch segment extending outward from the mount body. The catch segment may include a top surface and a bottom surface. The catch segment may define one or more foot engagement zones at the top surface or the bottom surface thereof.

17 Claims, 9 Drawing Sheets

(56) References Cited

U.S. PATENT DOCUMENTS

| | | | | |
|---|---|---|---|---|
| 6,267,260 | B1 * | 7/2001 | Lyons | B65F 1/163 220/264 |
| 6,502,873 | B1 | 1/2003 | Horseman | |
| 7,270,352 | B1 * | 9/2007 | Stuart | E05B 1/0053 292/336.3 |
| 2004/0261226 | A1 * | 12/2004 | Moody | E05B 53/001 16/413 |
| 2014/0197648 | A1 | 7/2014 | Brown | |
| 2018/0119473 | A1 * | 5/2018 | Jensen | E05F 5/08 |
| 2021/0348423 | A1 * | 11/2021 | Brown | E05B 1/0015 |
| 2022/0018154 | A1 * | 1/2022 | Madden | E05B 1/0015 |
| 2022/0108581 | A1 * | 4/2022 | Jain | G07F 17/0014 |
| 2023/0148387 | A1 * | 5/2023 | Farrel | E05B 1/0015 312/293.1 |

FOREIGN PATENT DOCUMENTS

| | | | | |
|---|---|---|---|---|
| DE | 202020102169 | U1 | 5/2020 | |
| GB | 2183724 | A | 6/1987 | |
| JP | 2003148005 | A | 5/2003 | |
| KR | 20060082263 | A | 7/2006 | |
| WO | WO-2022029759 | A1 * | 2/2022 | E05B 1/0069 |

* cited by examiner

ACCESSIBILITY PEDAL FOR A DRAWER OF AN OVEN APPLIANCE

FIELD OF THE DISCLOSURE

The present subject matter relates generally to an oven appliance, and more particularly to an accessibility accessory for an oven appliance.

BACKGROUND OF THE DISCLOSURE

Oven appliances generally define one or more enclosures supporting one or more heating elements. For instance, oven appliances can include a cabinet defining an insulated cooking chamber therein for receipt of food items for cooking. A cooktop having heating elements may be positioned at a top portion of the cabinet for, as an example, grilling, boiling, or frying food items thereon. Other heating elements, such as a bake heating element or broil heating element may be positioned within the cooking chamber to provide heat to food items located therein. The bake heating element is positioned at a bottom of the cooking chamber. The broil heating element positioned at a top of the cooking chamber. One or more electronic components may be housed within the cabinet outside of the cooking chamber.

Some oven appliances define a drawer recess below the cooking chamber. For instance, oven appliances can include a drawer assembly slidably mounted to the cabinet within the drawer recess. The drawer assembly can be configured as an insulated warming chamber of the oven appliance or as a storage drawer of the oven appliance. The drawer assembly of cooking appliances typically defines a recessed handle that a user may grab to manipulate a position of the drawer assembly. However, it can be difficult for user to open the drawer assembly via the recessed handle. For example, users that lack adequate grip strength or cannot bend their fingers due to previous injuries may be unable to open the drawer assembly via the recessed handle. As another example, users that have trouble bending down may be unable to open the drawer assembly due to its common location at the bottom of the cooking appliance. As yet another example, users that have items in their hands (e.g., food or food items, children, etc.) may be unable to open the drawer via the recessed handle.

Accordingly, an accessory for an oven appliance that can obviate one or more of the above-mentioned drawbacks would be useful.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, an oven appliance is provided. The oven appliance may include a cabinet. The cabinet may define a cooking chamber and a drawer recess. The drawer recess may be positioned below the cooking chamber. The oven appliance may include a drawer assembly slidably mounted to the cabinet within the drawer recess. The drawer assembly may include a drawer and a front panel. The drawer may define a compartment. The front panel may be attached to a front surface of the drawer, The oven appliance may include an accessibility pedal for manipulating a position of the drawer assembly. The accessibility pedal may include a mount body. The mount body may be mounted to the front panel. The accessibility pedal may include a catch segment extending outward from the mount body. The catch segment may include a top surface and a bottom surface. The catch segment may define one or more foot engagement zones at the top surface or the bottom surface thereof.

In another exemplary aspect of the present disclosure, an accessibility pedal for a drawer assembly of an oven appliance is provided. The drawer may include a front panel. The front panel may include a top surface and a bottom surface spaced apart along a vertical direction of the oven appliance. The accessibility pedal may include a mount body being mountable to a front panel of the drawer assembly. The mount body may include a first shell and a second shell. The first shell may be mounted to the top surface of the front panel. The first shell may include a first attachment portion. The second shell may be mounted to the bottom surface of the front panel. The second shell may include a second attachment portion. The first attachment portion and the second attachment portion may be fastened together. The accessibility pedal may include a catch segment extending outward from the mount body. The catch segment may include a top surface and a bottom surface. The catch segment may define one or more foot engagement zones at the top surface or the bottom surface thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
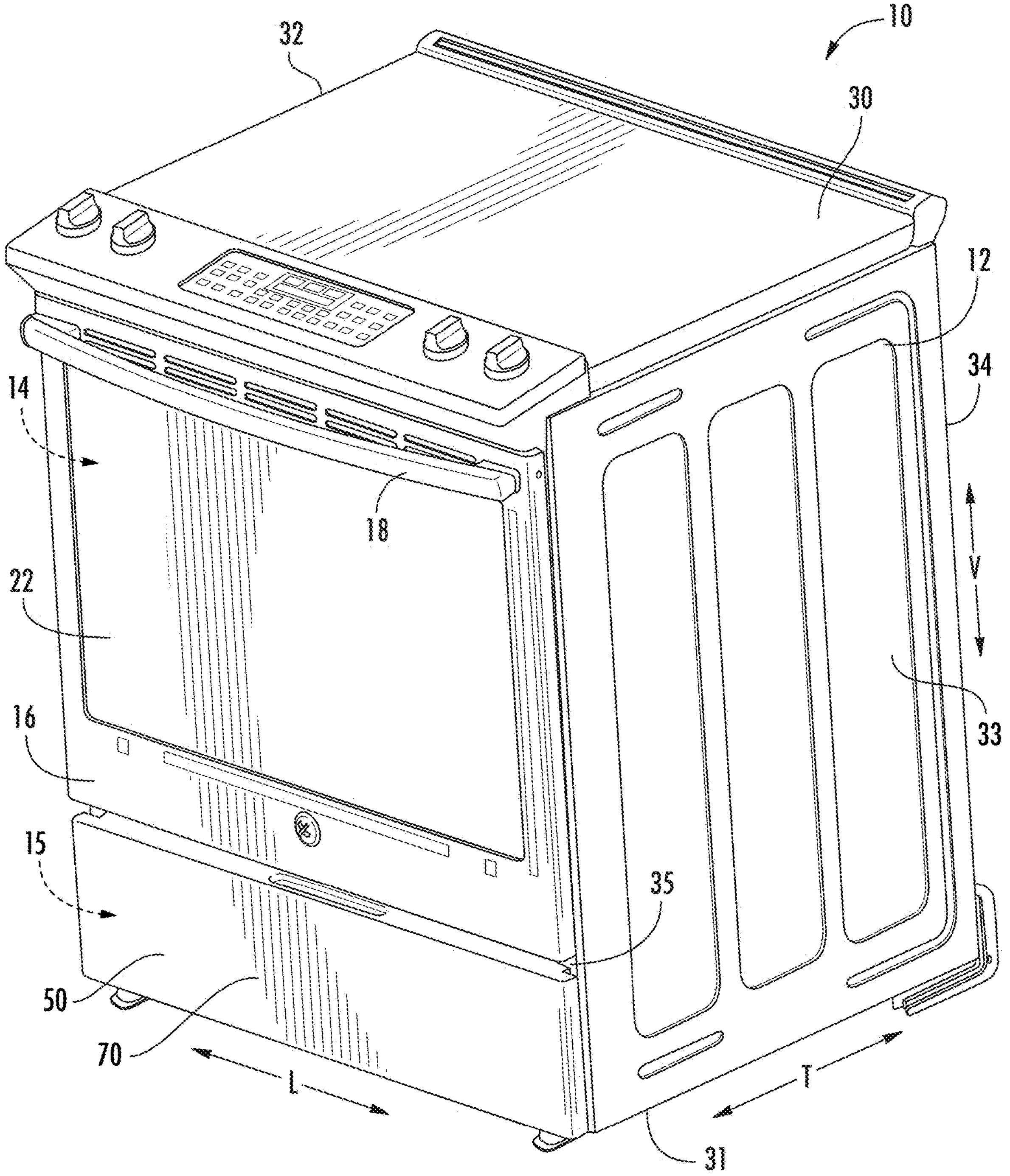
FIG. 1 provides a perspective view of an oven appliance according to one or more exemplary embodiments of the present subject matter.
Figure 2:
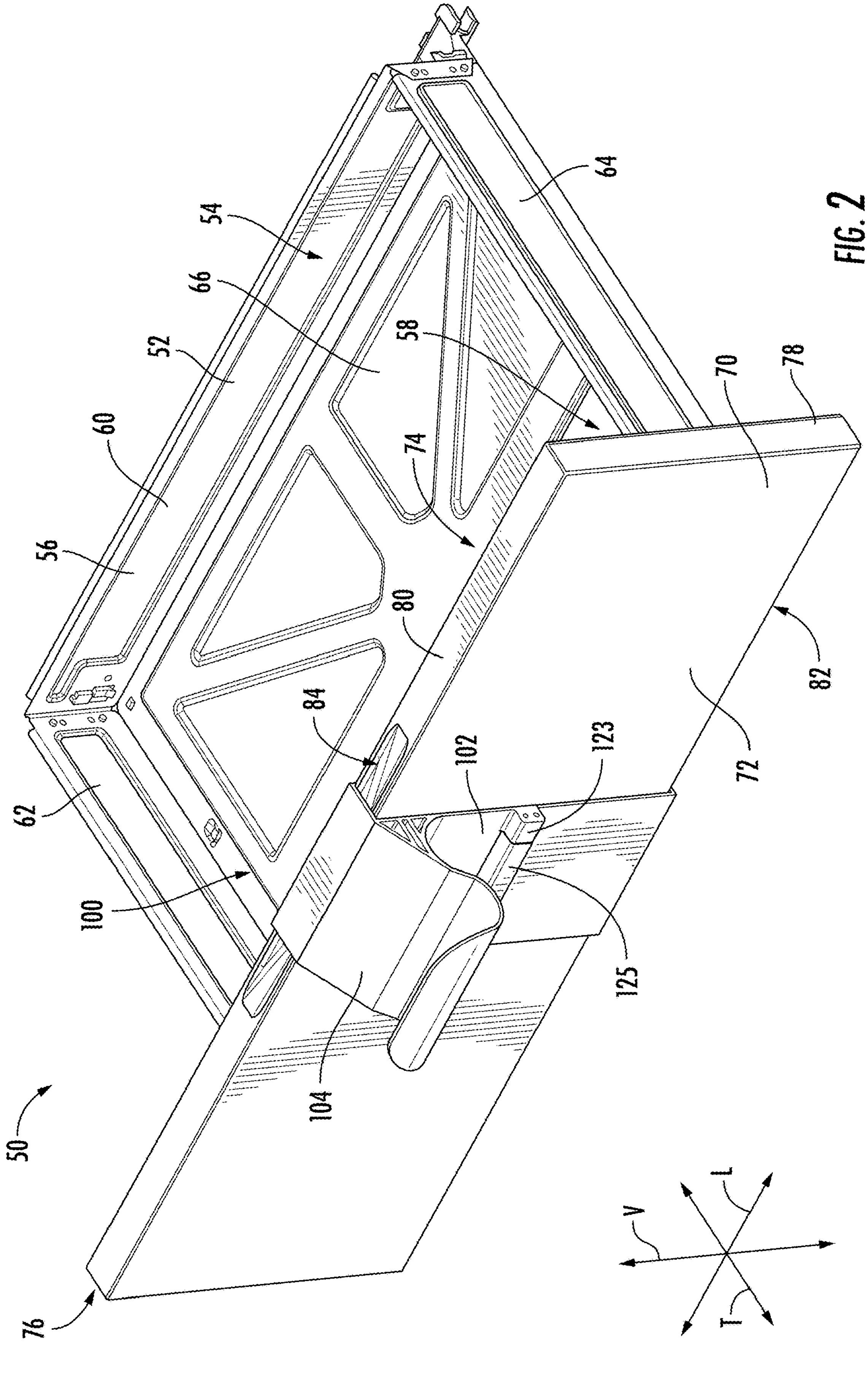
FIG. 2 provides a perspective view of a drawer assembly according to one or more exemplary embodiments of the present subject matter.
Figure 3:
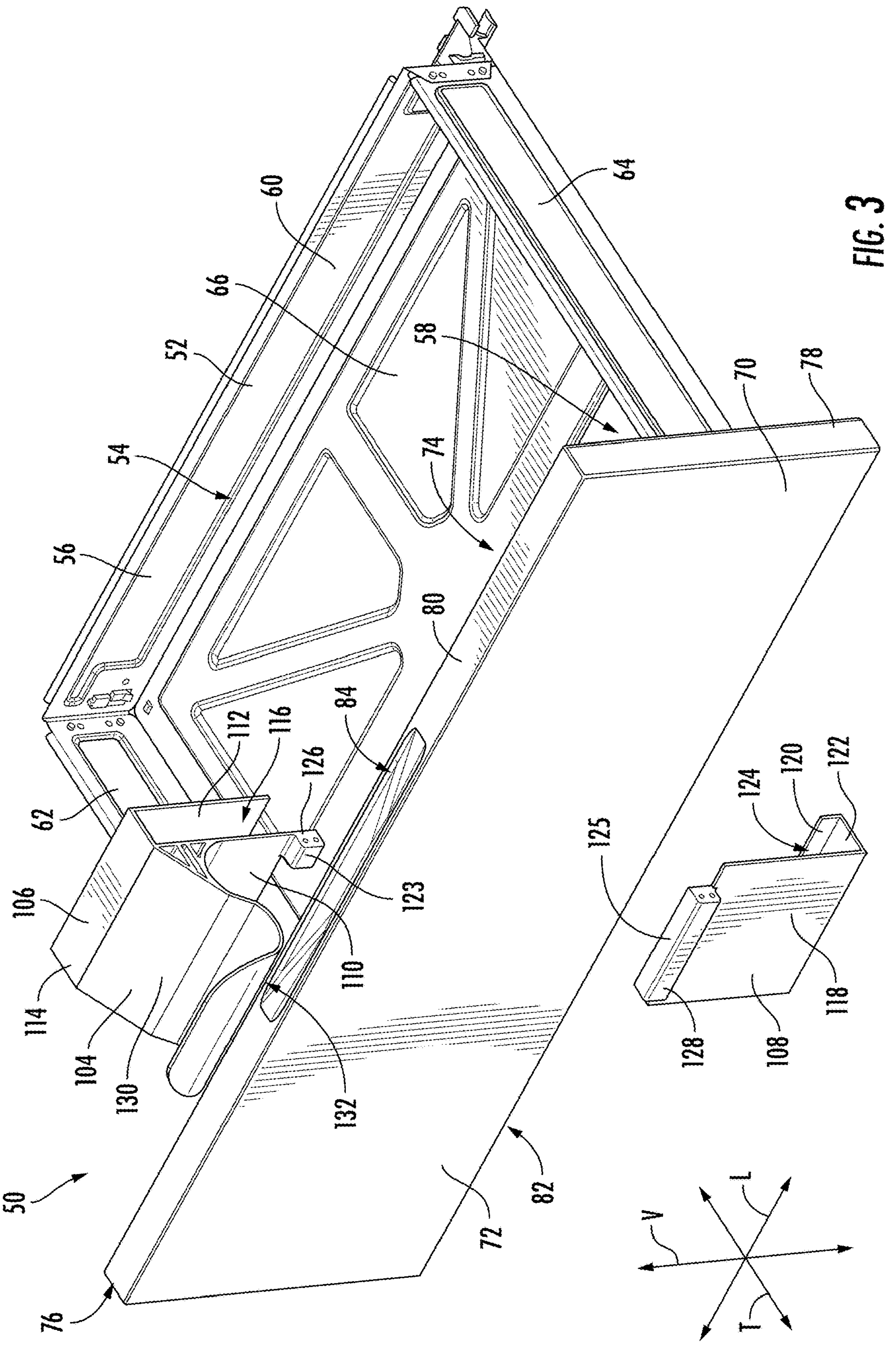
FIG. 3 provides a perspective view of the drawer assembly of FIG. 2.
Figure 4:
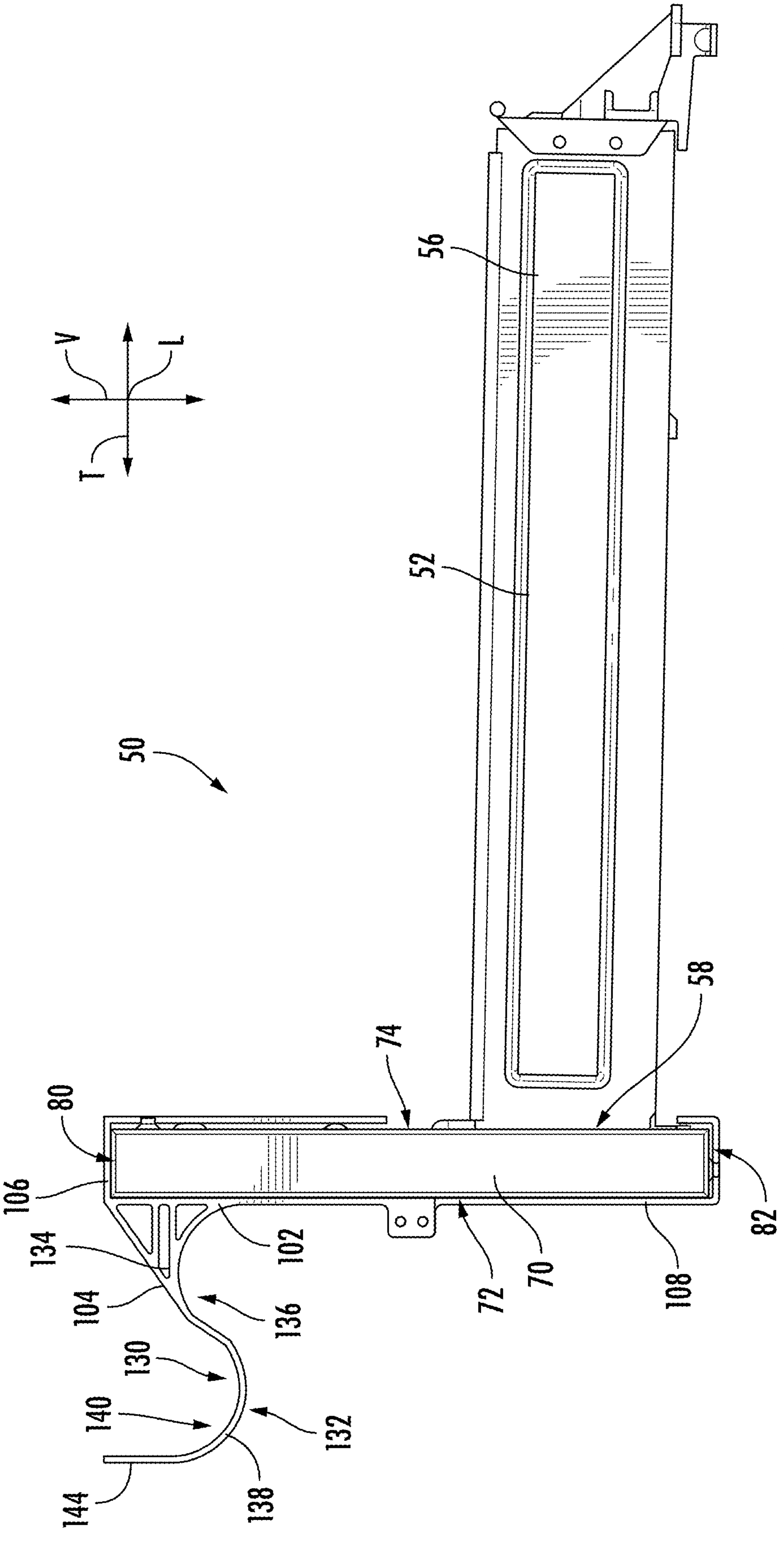
FIG. 4 provides a side view of the drawer assembly of FIG. 2.
Figure 5:
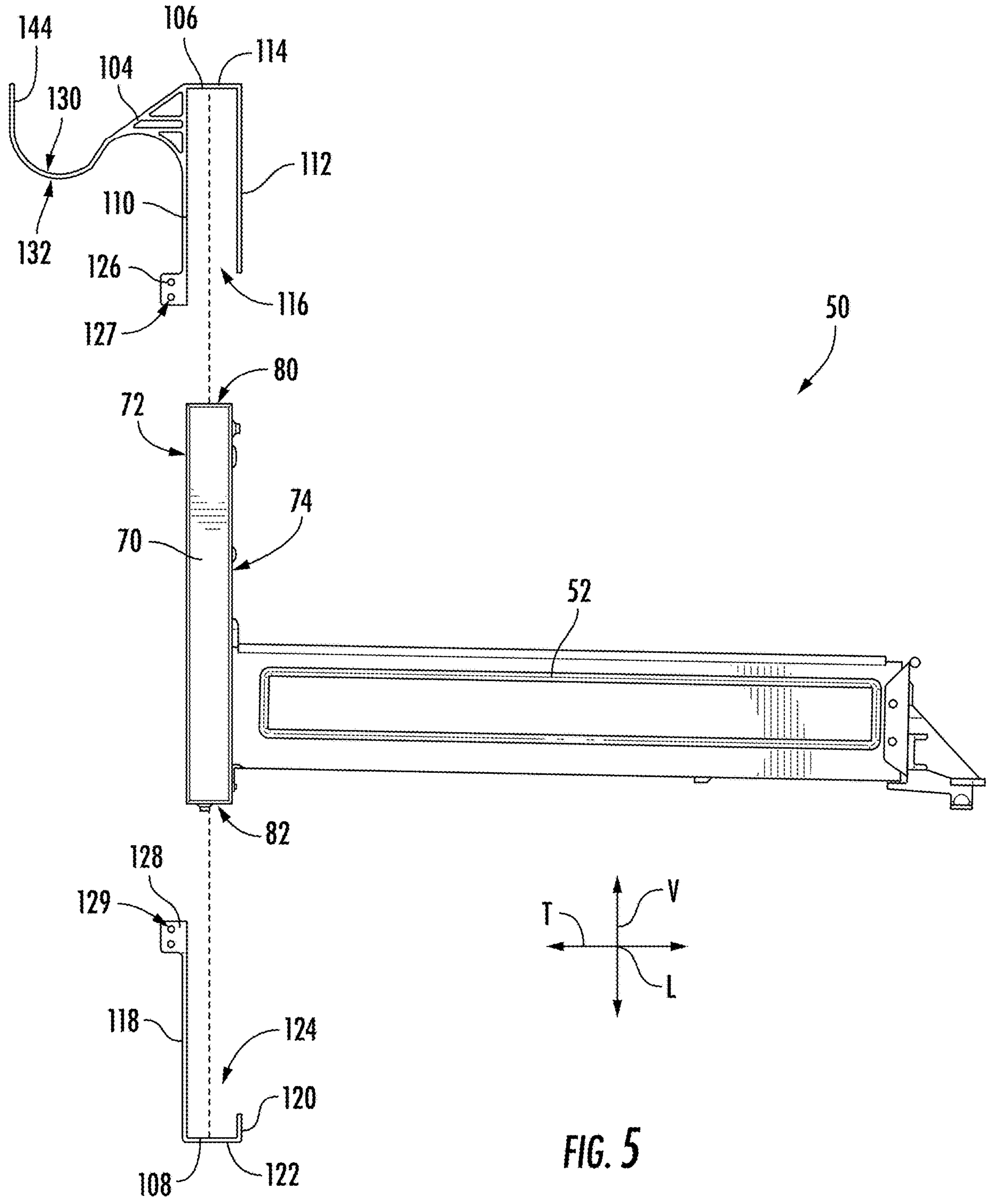
FIG. 5 provides a side view of the drawer assembly of FIG. 2.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Oven appliances can include a cabinet that defines a cooking chamber and a drawer recess positioned below the cooking chamber. A door may be rotatably hinged to the cabinet to selectively access the cooking chamber. For example, when the cooking of food items is desired. A drawer assembly can be slidably mounted to the cabinet within the drawer recess. Typically, to manipulate the position of the drawer assembly (e.g., relative to the cabinet), a user may be required to bend over and grasp a handle (e.g., an extruded handle or a recessed handle) of the drawer assembly. However, for some users bending over and grasping the handle may be difficult or impossible.

Notably, embodiments of the present subject matter advantageously provide an accessibility pedal that enables users to open or close the drawer assembly of the oven appliance without having to grasp the drawer handle or bend over. Specifically, the accessibility pedal enables users to open or close the drawer assembly with their feet. The accessibility pedal can be securely fixed to a front panel of the drawer assembly through various means. For example, the accessibility pedal can be securely fixed to the front panel via mechanical fasteners, interlocking tabs, or the like. The accessibility pedal advantageously includes a catch segment extended therefrom. The catch segment may form a protrusion (e.g., a serpentine shaped protrusion, a zig zag shaped protrusion, an "L" shaped protrusion, or the like) that serves as a connection point for a user's foot. Thus, the user may be allowed to pull or push the drawer assembly open or closed with ease. For example, a user may be able engage with the catch segment to push or pull the drawer assembly opened or closed without having to bend over and grasp the handle of the drawer assembly.

The accessibility pedal advantageously improves the accessibility and usability of the drawer assembly. For instance, for users with injured fingers or hands, as well as those who have difficulty bending down to access the drawer assembly. In addition, the accessory advantageously allows users to operate the drawer assembly even when their hands or arms are full with food, dishes, or other items.

Turning to the figures, FIG. 1 depicts an exemplary cooking appliance (e.g., oven appliance 10) that may be configured in accordance with aspects of the present disclosure. As shown, oven appliance 10 defines a vertical direction V, a lateral direction L, and a transverse direction T. The vertical direction V, lateral direction L, and transverse direction T are mutually perpendicular and form an orthogonal direction system. As will be understood by those skilled in the art, oven appliance 10 is provided by way of example only, and the present subject matter may be used in any suitable cooking appliance. Thus, the present subject matter may be used with other oven appliances having different configurations, such as wall ovens, electric ovens, gas ovens, etc.

Oven appliance 10 includes a cabinet 12 forming one or more interior volumes. For instance, the oven appliance 10 may form an insulated cooking chamber 14 and a drawer recess 15. The cooking chamber 14 and the drawer recess 15 may each be disposed within cabinet 12. The drawer recess 15 may be positioned below the cooking chamber 14 (e.g., along the vertical direction V). Insulated cooking chamber 14 is configured for the receipt of one or more food items to be cooked. Oven appliance 10 includes a door 16 rotatably mounted to cabinet 12 (e.g., with a hinge). A handle 18 is mounted to door 16 and assists a user with opening and closing door 16 in order to access insulated cooking chamber 14. For example, a user can pull on handle 18 to open or close door 16 and access insulated cooking chamber 14.

Oven appliance 10 can include a seal (e.g., gasket) between door 16 and cabinet 12 that assists with maintaining heat and cooking fumes within insulated cooking chamber 14 when door 16 is closed as shown. Door 16 may include a window 22, constructed for example from multiple parallel glass panes to provide for viewing the contents of insulated cooking chamber 14 when door 16 is closed and assist with insulating insulated cooking chamber 14. A baking rack may be positioned in insulated cooking chamber 14 for the receipt of food items or utensils containing food items. The baking rack may be slidably received onto embossed ribs or sliding rails such that the baking rack may be conveniently moved into and out of insulated cooking chamber 14 when door 16 is open.

As further illustrated, cabinet 12 includes multiple panels that enclose insulated cooking chamber 14 or the drawer recess 15. For example, cabinet 12 includes a top panel 30 and a bottom panel 31 that are spaced apart along the vertical direction V. Left panel 32 and right panel 33 (as defined according to the view as shown in FIG. 1) extend between top panel 30 and bottom panel 31, and are spaced apart along the lateral direction L. A rear panel 34 may additionally extend between top panel 30 and bottom panel 31 as well as between left panel 32 and right panel 33, and is spaced apart from door 16 along the transverse direction T. When door 16 is in the closed position, it may sit flush with a front panel 35 of cabinet 12. As shown, front panel 35 extends between top panel 30 and bottom panel 31 to generally define the opening to cooking chamber 14.

In some embodiments, panels 30, 31, 32, 33, 34, 35 of cabinet 12 are single ply sheet metal panels, but one skilled in the art will appreciate that any suitably rigid panel may be used while remaining within the scope of the present subject matter. For example, according to additional or alternative exemplary embodiments, panels 30, 31, 32, 33, 34, 35 may be constructed from a suitably rigid and thermally resistant plastic. Additionally, or alternatively, each panel 30, 31, 32, 33, 34, 35 may include multiple layers made from the same or different materials, and may be formed in any suitable shape.

Referring now to FIGS. 1 through 5, the oven appliance 10 includes a drawer assembly 50. In some embodiments, the drawer assembly 50 is configured as a storage drawer for the oven appliance 10. For instance, the drawer assembly 50 may hold cooking items such as baking sheets, shallow, pans, or the like within the drawer recess 15. However, it should be appreciated that in additional or alternative embodiments, the drawer assembly 50 may be configured as a broiling drawer or a warming drawer. For example, in additional or alternative embodiments, one or more heating elements can be positioned within (or in conductive or convective thermal communication with) the drawer recess 15 to broil or warm food items within the drawer assembly 50.

The drawer assembly 50 may be slidably mounted to the oven appliance 10 within the drawer recess 15. The drawer assembly 50 may include a drawer 52 and a front panel 70. The drawer 52 may define a compartment 54 for holding items therewithin. For example, the compartment 54 may hold cooking items, such as baking sheets, shallow pans, or the like. The drawer may include a body 56 that defines the shape of the compartment 54. In some embodiments, the body 56 includes a front panel 58, a rear panel 60, a first side panel 62, a second side panel 64, and a bottom panel 66, that together define the shape of the body 56. The front panel 58 and the rear panel 60 may be spaced apart along the transverse direction T. The first side panel 62 and the second side panel 64 may be spaced apart along the lateral direction L. The bottom panel 66 may be attached or fixed to a bottom edge of the front panel 58, the rear panel 60, the first side panel 62, and the second side panel 64.

The front panel 70 may be attached or fixed to the front panel 58 of the drawer 52. The front panel 70 may include a front surface 72, a rear surface 74, a first side surface 76, a second side surface 78, a top surface 80, and a bottom surface 82 that together define the shape of the front panel 70. In some embodiments, the top surface 80 defines a recessed handle 84 that a user can grasp to manipulate a position of the drawer assembly 50 (e.g., open or close the drawer assembly 50) relative to the cabinet 12.

However, some users of the oven appliance 10 may not be capable of (or otherwise avoid) utilizing the recessed handle 84 to manipulate a position of the drawer assembly 50. For example, some users can lack adequate grip strength to grasp to front panel 70 at the recessed handle 84 to manipulate the position of the drawer assembly 50. As another example, some users are unable to bend down to the location of the drawer assembly 50 to manipulate the position of the drawer assembly 50. As yet another example, some users may have items (e.g., food, dishes, household items, children, etc.) within their hands that prevent them from utilizing their hands to grasp the recessed handle 84 to manipulate the position of the drawer assembly 50.

Notably, embodiments of the present subject matter provide an accessibility pedal 100 that advantageously improves the accessibility of the drawer assembly 50. Referring now specifically to FIGS. 2 through 5, the accessibility pedal 100 may be attached or mounted to the drawer assembly 50. Specifically, the accessibility pedal 100 may be attached or mounted to the front panel 70 of the drawer assembly 50. The accessibility pedal 100 may generally include a mount body 102 and a catch segment 104.

The mount body 102 may be mountable to the drawer assembly 50. Specifically, the mount body 102 may be be attached or mounted to the front panel 70 of the drawer assembly 50. The mount body 102 may include two or more distinct members that form the mount body 102. The two or more distinct members may each be mounted to the front panel 70. The two or more distinct members may be fastened or attached together once mounted to the front panel 70 to secure the members to the front panel 70. In some embodiments, the mount body 102 includes a first shell 106 and a second shell 108. The first shell 106 may be mounted to the top surface 80 of the front panel 70. For instance, the first shell 106 may include a front plate 110, a rear plate 112, and a top plate 114. When mounted to front panel 70, the front plate 110 and the rear plate 112 may be spaced apart along the transverse direction T. In addition, the top plate 114 may be fixed between a top edge of the front plate 110 and a top edge of the rear plate 112. The first shell 106 may define an upper opening 116 between the front plate 110, the rear plate 112, and the top plate 114. The shape or size of the upper opening 116 may be configured to receive an upper portion of the front panel 70 such that the front plate 110 may interface with the front surface 72, the rear plate 112 may interface with the rear surface 74, and the top plate 114 may interface with the top surface 80.

The second shell 108 may be mounted to the bottom surface 82 of the front panel 70. For instance, the second shell 108 may include a front plate 118, a rear plate 120, and a bottom plate 122. When mounted to the front panel 70, the front plate 118 and the rear plate 120 may be spaced apart along the transverse direction T. In addition, the bottom plate 122 may be positioned between a bottom edge of the front plate 118 and the rear plate 120. The second shell may define a lower opening 124 between the front plate 118, the rear plate 120, and the bottom plate 122. The shape and size of the lower opening 124 may be configured such that the front plate 118 may interface with the front surface 72, the rear plate 120 may interface with the rear surface 74, and the bottom plate 122 may interface with the bottom surface 82.

The first shell 106 may include a first attachment portion 126 that is attached to a second attachment portion 128 of the second shell 108. In some embodiments, the first attachment portion 126 is disposed at a bottom edge of the front plate 110 of the first shell 106. The first attachment portion 126 may include a first attachment block 123. In some embodiments, the first attachment block 123 includes a pair of blocks disposed at opposing lateral sides of the front plate 110. In some such embodiments, the second attachment portion 128 is disposed at a top edge of the front plate 118 of the second shell 108. The second attachment portion 128 may include a second attachment block 125. The second attachment block 125 may fit in between the first attachment block 123 such that the first attachment portion 126 may be attached to the second attachment portion 128 in front of the front surface 72 of the front panel 70

For instance, the first attachment portion 126 may define a first set of fastener holes 127 that are aligned with a second set of fastener holes 129 of the second attachment portion 128. The first set of fastener holes 127 may be defined through the first attachment block 123. The second set of fastener holes may be defined through the second attachment block 125. One or more mechanical fasteners (not depicted) may be disposed within the first set of fastener holes 127 and the second set fastener holes 129 to attach or fasten the first shell 106 to the second shell 108. For example, one or more screws, bolts, or the like may be disposed within the first set of fastener holes 127 and the second set fastener holes 129 to attach or fasten the first shell 106 to the second shell 108.

In additional or alternative embodiments, the first shell 106 may be attached or fastened to the second shell 108 in any suitable manner. For example, in additional or alternative embodiments, the first shell 106 and the second shell 108 may include interlocking tabs that engage with one another to attach or fasten the first shell 106 to the second shell 108. For instance, the first shell 106 may include one or more tongues that may engage with one or more grooves of the second shell 108 to attach or fasten the first shell 106 to the second shell 108.

The catch segment 104 may extend outward from the mount body 102. Specifically, the catch segment 104 may extend outward along the transverse direction T away from the front surface 72 of the front panel 70. The catch segment 104 may provide one or more engagement areas or zones where a user may engage with the accessibility pedal 100. For instance, when a user desires to open or close the drawer assembly 50, the user may utilize or engage his/her foot with the one or more engagement zones to push or pull on the accessibility pedal 100. In this regard, the user may be capable of opening or closing the drawer assembly with having to grasp the front panel 70 with a hand or bending over.

Specifically, the catch segment 104 may include a top surface 130 and a bottom surface 132. The top surface 130 and the bottom surface 132 may generally be spaced apart along the vertical direction V. As mentioned above, the catch segment 104 may include one or more foot engagement zones that may be engaged by the foot of a user. For instance, the one or more foot engagement zones may generally corresponds to surfaces or areas on the accessibility pedal 100 that a user may engage with his/her foot to manipulate a position of the drawer assembly 50. For example, the one or more foot engagement zones may be defined at the top surface 130 or the bottom surface 132 of the catch segment 104. In addition, the catch segment 104 may include a vertical lip 144 at a distal end of the catch segment 104. In some embodiments, the vertical lip 144 defines a foot engagement zone at a top surface thereof.

As illustrated, the catch segment 104 may define a wavy or a serpentine shape. The catch segment 104 may define two distinct curves (e.g., a concave curve and a convex curve) that are formed together to define the wavy or serpentine shape of the catch segment 104. For example, the catch segment 104 may define a concave portion 134 that defines a first foot engagement zone 136 at the bottom surface 132 of the catch segment 104. The catch segment 104 may also include a convex portion 138 that defines a second foot engagement zone 140 at the top surface 142 of the catch segment 104.

Figure 6:
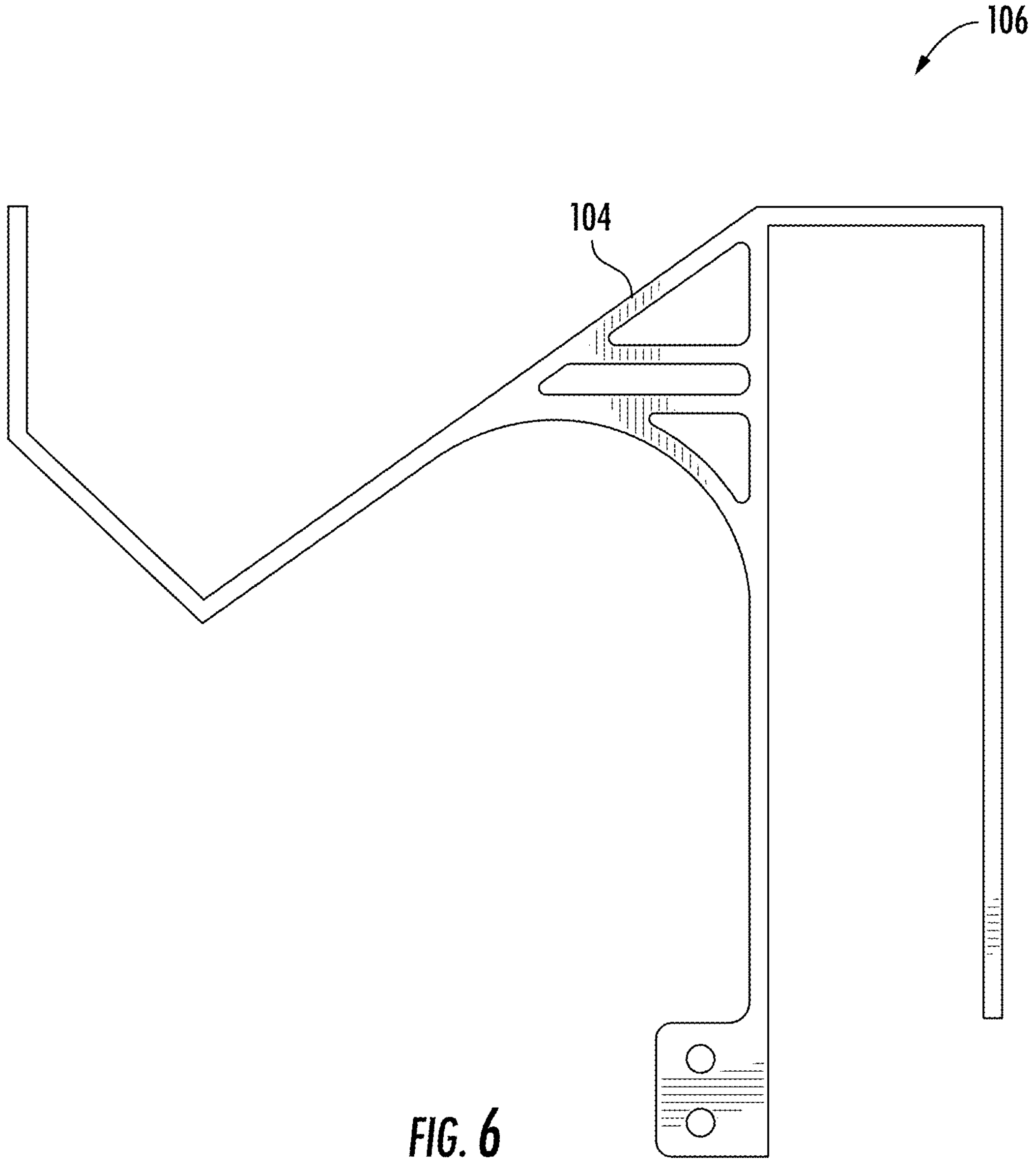
FIG. 6 provides a side view of a first shell of an accessibility pedal according to one or more exemplary embodiments of the present subject matter.
Figure 7:
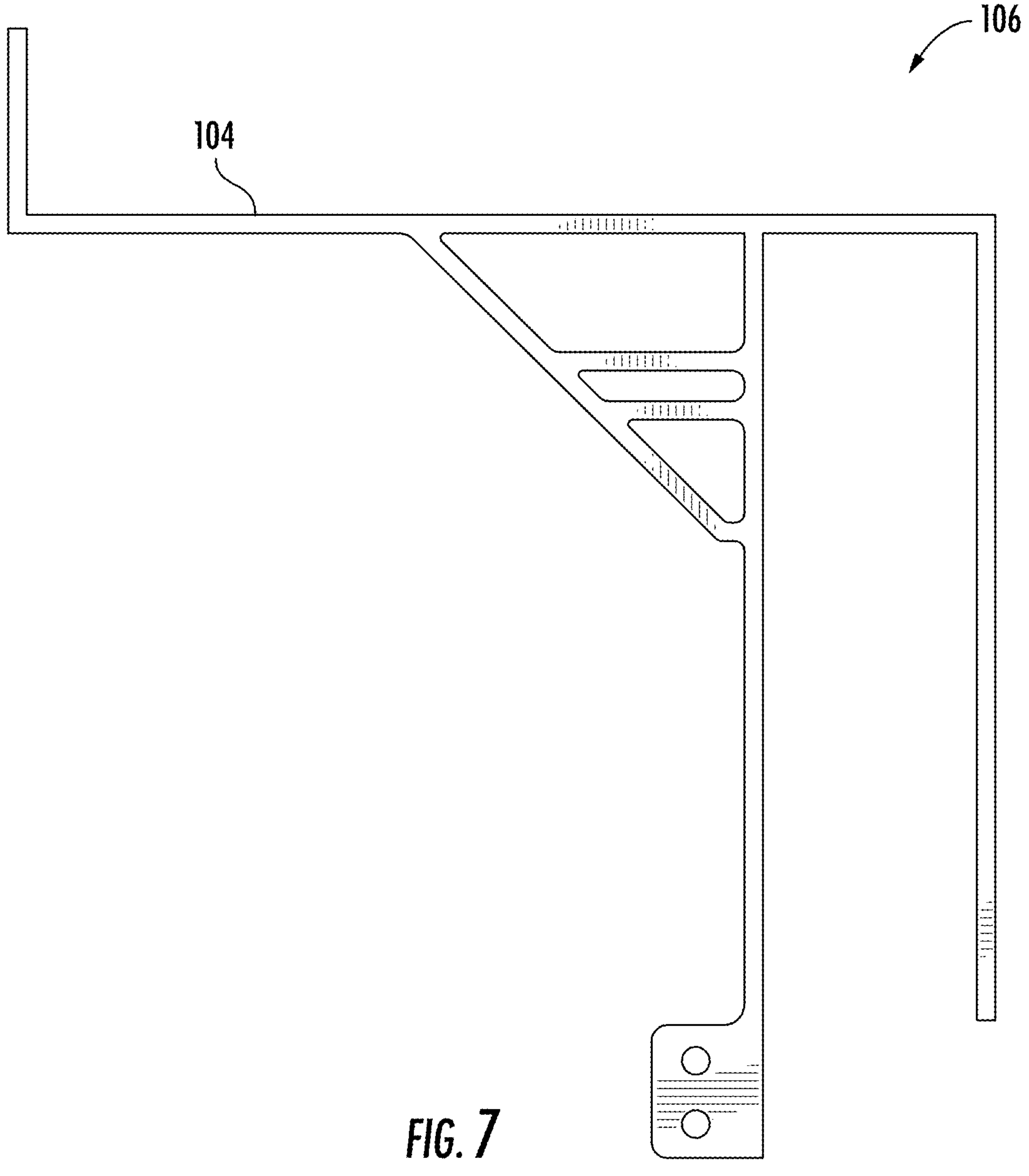
FIG. 7 provides a side view of a first shell of an accessibility pedal according to one or more exemplary embodiments of the present subject matter.

In additional or alternative embodiments, the catch segment 104 of the first shell 106 may define any suitable shape that provides one or more foot engagement zones for a user's foot to engage with. For example, referring now to FIG. 6 the catch segment 104 may define a zig zag shape. As another example, referring now to FIG. 7, the catch segment 104 may define an "L" shape.

Figure 8:
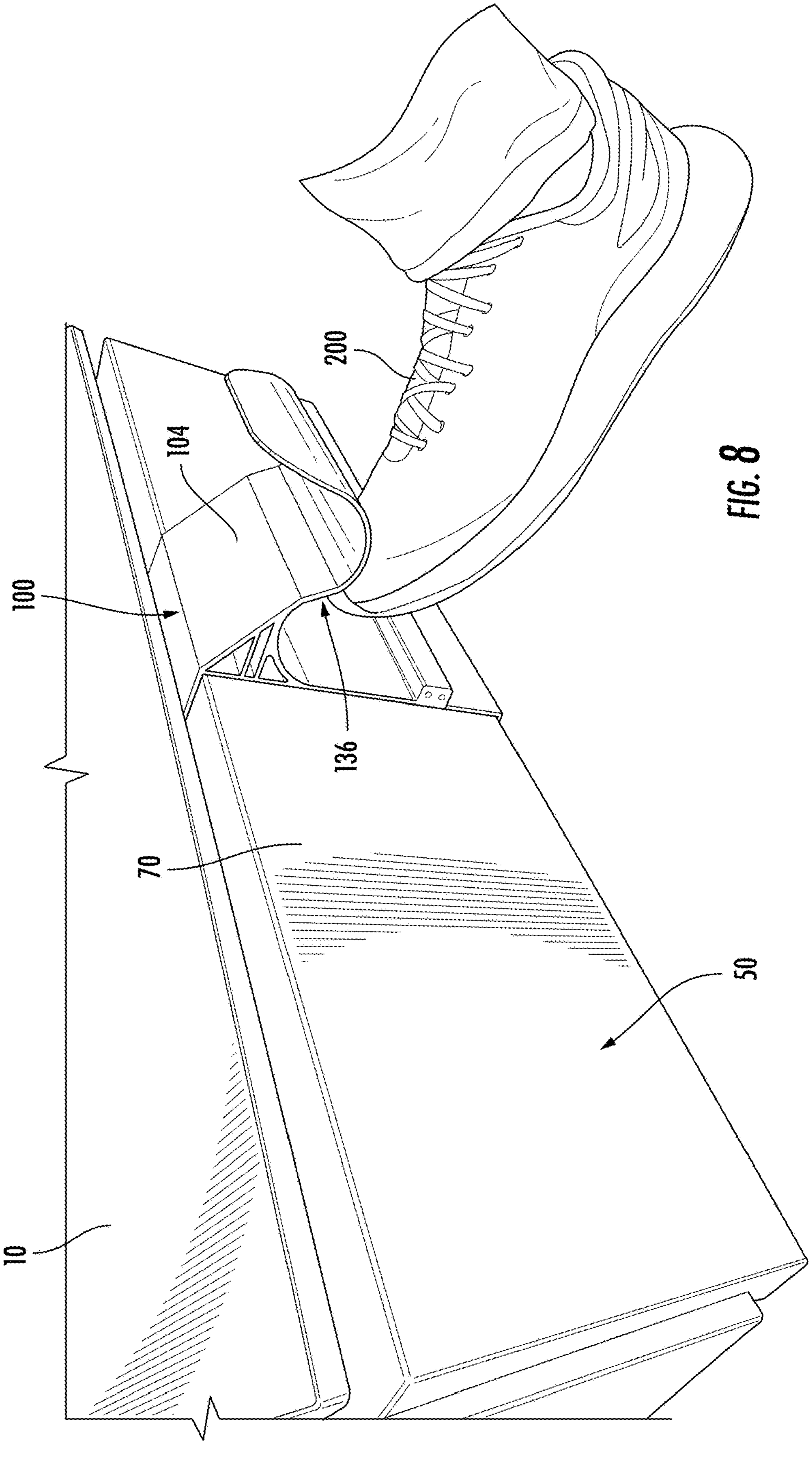
FIG. 8 provides a perspective view of a user engaging with an accessibility pedal attached to a drawer assembly according to one or more exemplary embodiments of the present subject matter.
Figure 9:
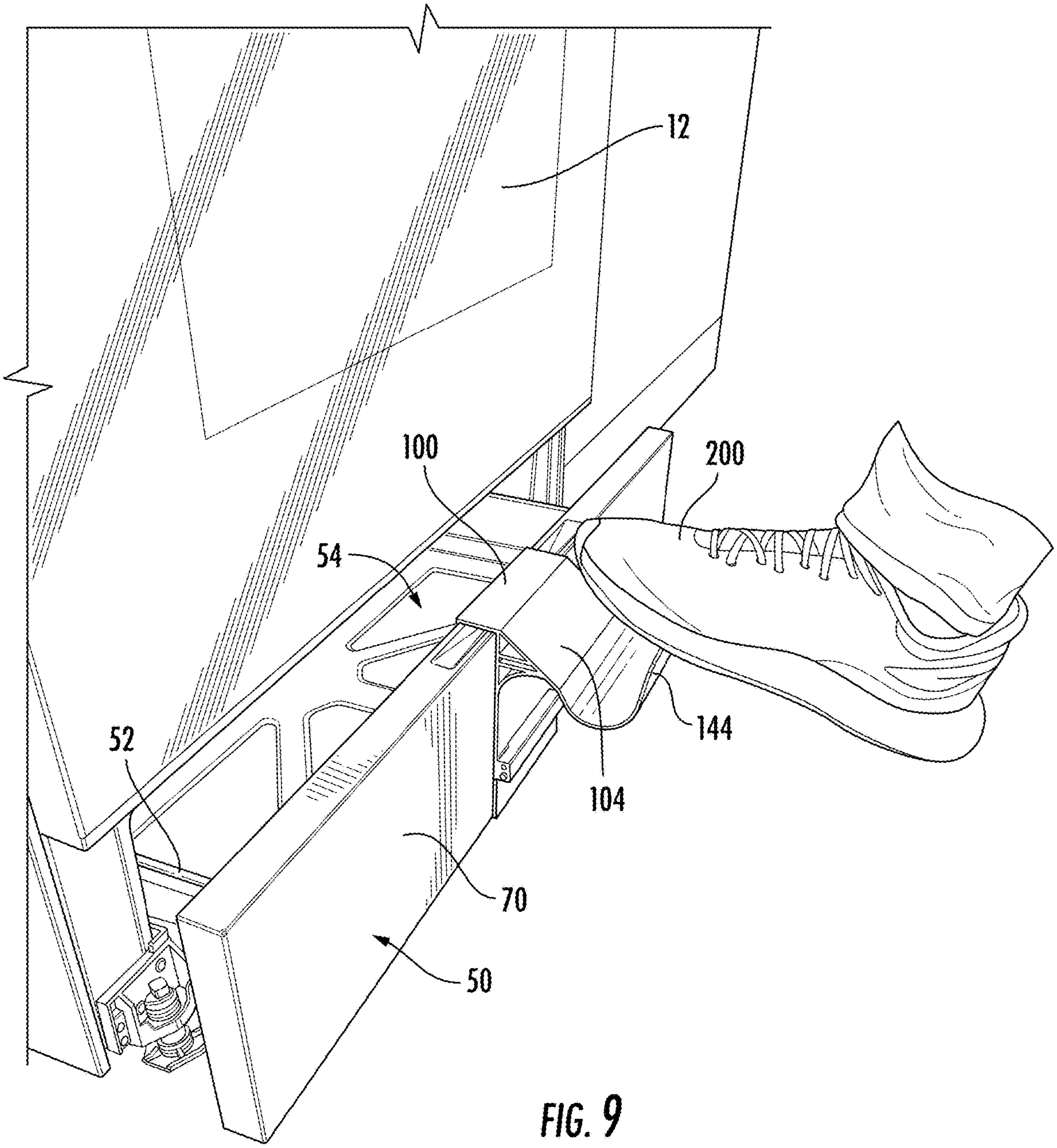
FIG. 9 provides a perspective view of a user engaging with an accessibility pedal attached to a drawer assembly according to one or more exemplary embodiments of the present subject matter.

Turning now to FIGS. 8 and 9, illustrative embodiments of a foot 200 of a user engaging with the accessibility pedal 100 to manipulate a position of the drawer assembly 50 are provided. For example, as illustrated in FIG. 8, a top portion of a user's foot 200 may engage with the first foot engagement zone 136 when manipulation of the position of the drawer assembly 50 is desired. Specifically, the user may apply an outward force via his/her foot 200 to the catch segment 104 at the first foot engagement zone 136 to open the drawer assembly 50.

As another example, as illustrated in FIG. 9, a bottom portion of the user's foot 200 may engage with the foot engagement zone located a top of the vertical lip 144 of the catch segment 104 when manipulation of the position of the drawer assembly 50 is desired. Specifically, the user may apply a force (e.g., an inward force or an outward force) via his/her foot 200 to the vertical lip 144 of the catch segment 104 when opening or closing of the drawer assembly 50 is desired.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance comprising:

a cabinet defining a cooking chamber and a drawer recess, the drawer recess being positioned below the cooking chamber;

a drawer assembly slidably mounted to the cabinet within the drawer recess, the drawer assembly comprising drawer and a front panel, the drawer defining a compartment, the front panel being attached to a front surface of the drawer, the front panel comprising a top horizontal surface and a bottom horizontal surface spaced apart along a vertical direction of the oven appliance; and an accessibility pedal for manipulating a position of the drawer assembly, the accessibility pedal comprising:

a mount body being mounted to the front panel, the mount body comprising a first shell mounted to the top horizontal surface of the front panel and a second shell mounted to the bottom horizontal surface of the front panel, and a catch segment extending outward from the mount body, the catch segment comprising a top surface and a bottom surface, the catch segment defining one or more foot engagement zones at the top surface or the bottom surface thereof.

2. The oven appliance of claim 1, wherein the first shell comprises a first attachment portion, wherein the second shell comprises a second attachment portion, and wherein the first attachment portion and the second attachment portion are fastened together.

3. The oven appliance of claim 2, wherein the first attachment portion defines a first set of fastener holes therethrough, wherein the second attachment portion comprises a second set of fastener holes therethrough, wherein the first set of fastener holes and the second set of fastener holes are aligned, and wherein one or more mechanical fasteners are disposed within the first set of fastener holes and the second set of fastener holes to fasten the first attachment portion and the second attachment portion together.

4. The oven appliance of claim 1, wherein the front panel further comprises a front surface and a rear surface spaced apart along a transverse direction of the oven appliance, wherein the first shell comprises a rear plate, a top plate, and a front plate, wherein the rear plate, the top plate, and the front plate of the first shell together define an upper opening, wherein the first shell is mounted to the top horizontal surface of the front panel at the upper opening, wherein the second shell comprises a rear plate, a bottom plate, and a front plate, wherein the rear plate, the bottom plate, and the front plate of the second shell together define a lower opening, and wherein the second shell is mounted to the bottom horizontal surface of the front panel at the lower opening.

5. The oven appliance of claim 1, wherein the catch segment is extended outward from the first shell of the mount body.

6. The oven appliance of claim 1, wherein the catch segment defines a serpentine shape.

7. The oven appliance of claim 1, wherein the catch segment defines a zig zag shape.

8. The oven appliance of claim 1, wherein the catch segment defines an L shape.

9. The oven appliance of claim 1, wherein the catch segment includes a vertical lip at a distal end thereof, and wherein the vertical lip defines a foot engagement zone of the one or more foot engagement zones.

10. An accessibility pedal on a drawer assembly of an oven appliance, the drawer assembly comprising a front panel, the front panel comprising a top horizontal surface and a bottom horizontal surface spaced apart along a vertical direction of the oven appliance, the accessibility pedal comprising:

a mount body being mountable to a front panel of the drawer assembly, the mount body comprising a first shell and a second shell, the first shell being mounted to the top horizontal surface of the front panel, the first shell comprising a first attachment portion, the second shell being mounted to the bottom horizontal surface of the front panel, the second shell comprising a second attachment portion, the first attachment portion and the second attachment portion being fastened together, and a catch segment extending outward from the mount body, the catch segment comprising a top surface and a bottom surface, the catch segment defining one or more foot engagement zones at the top surface or the bottom surface thereof.

11. The accessibility pedal of claim 10, wherein the first attachment portion defines a first set of fastener holes therethrough, wherein the second attachment portion comprises a second set of fastener holes therethrough, wherein the first set of fastener holes and the second set of fastener holes are aligned, and wherein one or more mechanical fasteners are disposed within the first set of fastener holes and the second set of fastener holes to fasten the first attachment portion and the second attachment portion together.

12. The accessibility pedal of claim 10, wherein the front panel further comprises a front surface and a rear surface spaced apart along a transverse direction of the oven appliance, wherein the first shell comprises a rear plate, a top plate, and a front plate, wherein the rear plate, the top plate, and the front plate of the first shell together define an upper opening, wherein the first shell is mounted to the top horizontal surface of the front panel at the upper opening, wherein the second shell comprises a rear plate, a bottom plate, and a front plate, wherein the rear plate, the bottom plate, and the front plate of the second shell together define a lower opening, and wherein the second shell is mounted to the bottom horizontal surface of the front panel at the lower opening.

13. The accessibility pedal of claim 10, wherein the catch segment is extended outward from the first shell of the mount body.

14. The accessibility pedal of claim 10, wherein the catch segment defines a serpentine shape.

15. The accessibility pedal of claim 10, wherein the catch segment defines a zig zag shape.

16. The accessibility pedal of claim 10, wherein the catch segment defines an L shape.

17. The accessibility pedal of claim 10, wherein the catch segment includes a vertical lip at a distal end thereof, and wherein the vertical lip defines a foot engagement zone of the one or more foot engagement zones.

* * * * *